US012558855B2

(12) United States Patent
Yang et al.

(10) Patent No.: US 12,558,855 B2
(45) Date of Patent: Feb. 24, 2026

(54) METHOD FOR INTERLOCKING MULTI-MATERIAL INTERFACE DESIGN

(71) Applicant: University of Louisville Research Foundation, Inc., Louisville, KY (US)

(72) Inventors: Li Yang, Crestwood, KY (US); Sumit Paul, Louisville, KY (US); Antonio Coriano, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 258 days.

(21) Appl. No.: 18/358,889

(22) Filed: Jul. 25, 2023

(65) Prior Publication Data

US 2024/0025128 A1 Jan. 25, 2024

Related U.S. Application Data

(60) Provisional application No. 63/391,903, filed on Jul. 25, 2022.

(51) Int. Cl.
*B29C 64/40* (2017.01)
*B29C 65/44* (2006.01)

(52) U.S. Cl.
CPC .................................... *B29C 65/44* (2013.01)

(58) Field of Classification Search
None
See application file for complete search history.

(56) References Cited

U.S. PATENT DOCUMENTS

| | | | | |
|---|---|---|---|---|
| 10,442,132 B1* | 10/2019 | Amano | ................. | B33Y 80/00 |
| 2017/0182712 A1* | 6/2017 | Scribner | ............... | B33Y 40/00 |
| 2018/0126412 A1* | 5/2018 | Huang | .................. | B05D 1/265 |
| 2020/0045832 A1* | 2/2020 | Hikmet | ................... | H05K 1/18 |
| 2021/0308937 A1* | 10/2021 | Broach | ............... | B29C 64/106 |
| 2021/0370606 A1* | 12/2021 | Kim | ........................ | G06F 30/17 |

OTHER PUBLICATIONS

Ribeiro et al., Interface geometries in 3D multi-material prints by fused filament fabrication, Rapid Prototyping Journal (2019) 25 (1):38-46.*

Freund, R., et al., "Determination of influencing factors on interface strength of additively manufactured multi-material parts by material extrusion", Applied Sciences, vol. 9, No. 9, 1782, Apr. 29, 2019, pp. 20.

Ribeiro, M., et al., "Interface geometries in 3D multi-material prints by fused filament fabrication", Rapid Prototyping Journal, vol. 25, No. 1, 2018, pp. 38-46.

Skylar-Scott, M.A., et al., "Voxelated soft matter via multimaterial multinozzle 3D printing", Nature, vol. 575, No. 7782, 2019, pp. 330-335.

* cited by examiner

*Primary Examiner* — Yung-Sheng M Tsui

(74) *Attorney, Agent, or Firm* — Hamilton, Brook, Smith & Reynolds, P.C.

(57) ABSTRACT

A method for interlocking a multi-material interface includes forming interlocking mechanisms on a body, the interlocking mechanisms forming protrusions and cavities, wherein the interlocking mechanisms and the body comprise a base material. The method further includes covering the protrusions and filling the cavities with a filling material using material extrusion.

16 Claims, 9 Drawing Sheets

800

| Unit cell | Relative density (Design/Actual) | $L_1/H$ (mm) | $L_2$ (mm) | $L_3$ (mm) | $\theta$ (deg) | t (mm) |
|---|---|---|---|---|---|---|
| Re-entrant auxetic | 0.4/0.397 | 3.9 | 2.97 | | 75 | 1.3 |
| | 0.5/0.509 | 3.3 | 2.51 | | 75 | 1.3 |
| | 0.6/0.608 | 2.9 | 2.2 | | 75 | 1.3 |
| BCC | 0.4/0.395 | 7.63 | 7.63 | 6 | | 1.9 |
| | 0.5/0.505 | 6.48 | 6.48 | 5.1 | | 1.9 |
| | 0.6/0.602 | 5.72 | 5.72 | 4.5 | | 1.9 |
| Octahedral | 0.4/0.399 | 4.3 | 4.3 | 4.3 | | 1.3 |
| | 0.5/0.506 | 3.6 | 3.6 | 3.6 | | 1.3 |
| | 0.6/0.560 | 3.3 | 3.3 | 3.3 | | 1.3 |

900

FORM INTERLOCKING MECHANISMS ON A BODY, THE INTERLOCKING
MECHANISMS FORMING PROTRUSIONS AND CAVITIES, WHEREIN THE
INTERLOCKING MECHANISMS AND THE BODY COMPRISE A BASE MATERIAL
902

COVER THE PROTRUSIONS AND FILLING THE CAVITIES WITH A FILLING
MATERIAL USING MATERIAL EXTRUSION
904

METHOD FOR INTERLOCKING MULTI-MATERIAL INTERFACE DESIGN

CROSS REFERENCE TO RELATED APPLICATION

The presently disclosed subject matter claims the benefit of U.S. Provisional Patent Application Ser. No. 63/391,903, filed Jul. 25, 2022, the disclosure of which, including all Appendices, is incorporated herein by reference in its entirety.

TECHNICAL FIELD

The presently disclosed subject matter relates to multi-material interfaces. Specifically, the presently disclosed subject matter relates to interlocking multi-material interfaces.

BACKGROUND

Current design approaches for multi-material interfaces generally focus on improving the interfacial bonding strength between the constituent materials. In the case of low-compatibility materials, additional intermediate phases (interphases) are introduced to ensure interfacial bonding between the material, which could potentially limit the performance of the resulting structures. There is a need for multi-material interfaces without intermediate phases.

SUMMARY

This Summary lists several embodiments of the presently disclosed subject matter, and in many cases lists variations and permutations of these embodiments of the presently disclosed subject matter. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this Summary or not. To avoid excessive repetition, this Summary does not list or suggest all possible combinations of such features.

In some embodiments, the presently disclosed subject matter provides example methods for interlocking multi-material interfaces includes forming interlocking mechanisms on a body, the interlocking mechanisms forming protrusions and cavities, wherein the interlocking mechanisms and the body comprise a base material. In some embodiments, the method further comprises covering the protrusions and filling the cavities with a filling material using material extrusion.

In some embodiments, forming interlocking mechanisms comprises depositing a metallic powder to a surface of the body, molding the metallic powder using mechanical structures, and heating the metallic powder to form a metallic solid layer.

In some embodiments of the method described herein, the method comprises removing the mechanical structures from the formed metallic solid layer.

In some embodiments, the mechanical structures comprise a geometric shape.

In some embodiments, forming the interlocking mechanisms comprises subtracting a portion of the base material from the body.

In some embodiments, the interlocking mechanisms comprise re-entrant auxetic structures.

In some embodiments, covering the interlocking mechanisms with the filling material comprises filling cavities formed by the re-entrant auxetic structures with the filling material.

In some embodiments, the interlocking mechanisms comprise a repeating geometric pattern.

In some embodiments, the filling material is non-compatible or low-compatible with the base material.

In some embodiments of the method described herein, the cavities comprise a first cross-sectional area and a second cross-sectional area between the first cross-sectional area and a surface of the body, wherein the first cross-sectional area is smaller than the second cross-sectional area.

In some embodiments, the presently disclosed subject matter also relates to exemplary systems for interlocking multi-material interfaces includes a body including a base material. In some embodiments, the system further comprises interlocking mechanisms on the body. In some embodiments, the interlocking mechanisms form protrusions and cavities on the body, wherein the interlocking mechanisms comprise the base material. In some embodiments, the system further comprises a filling material covering the protrusions and filling the cavities.

In some embodiments of the system described herein, the interlocking mechanisms are formed by depositing a metallic powder to a surface of the body, molding the metallic powder using mechanical structures, and heating the metallic powder to form a metallic solid layer.

In some embodiments, the mechanical structures are removed from the formed metallic solid layer.

In some embodiments, the mechanical structures comprise a geometric shape.

In some embodiments, the interlocking mechanisms comprise octahedral structures.

In some embodiments, the interlocking mechanisms comprise re-entrant auxetic structures.

In some embodiments, the interlocking mechanisms comprise body-centered cubic (BCC) structures.

In some embodiments, the interlocking mechanisms comprise a repeating geometric pattern.

In some embodiments, the filling material is non-compatible or low-compatible with the base material.

In some embodiments, the cavities comprise a first cross-sectional area and a second cross-sectional area between the first cross-sectional area and a surface of the body, wherein the first cross-sectional area is smaller than the second cross-sectional area.

Thus, it is an object of the presently disclosed subject matter to provide interlocking multi-material interfaces.

An object of the presently disclosed subject matter having been stated herein above, and which is achieved in whole or in part by the presently disclosed subject matter, other objects will become evident as the description proceeds when taken in connection with the accompanying Figures as best described herein below.

BRIEF DESCRIPTION OF THE FIGURES

The subject matter described herein will now be explained with reference to the accompanying Figures of which.

DETAILED DESCRIPTION

I. Definitions

Figure 1:
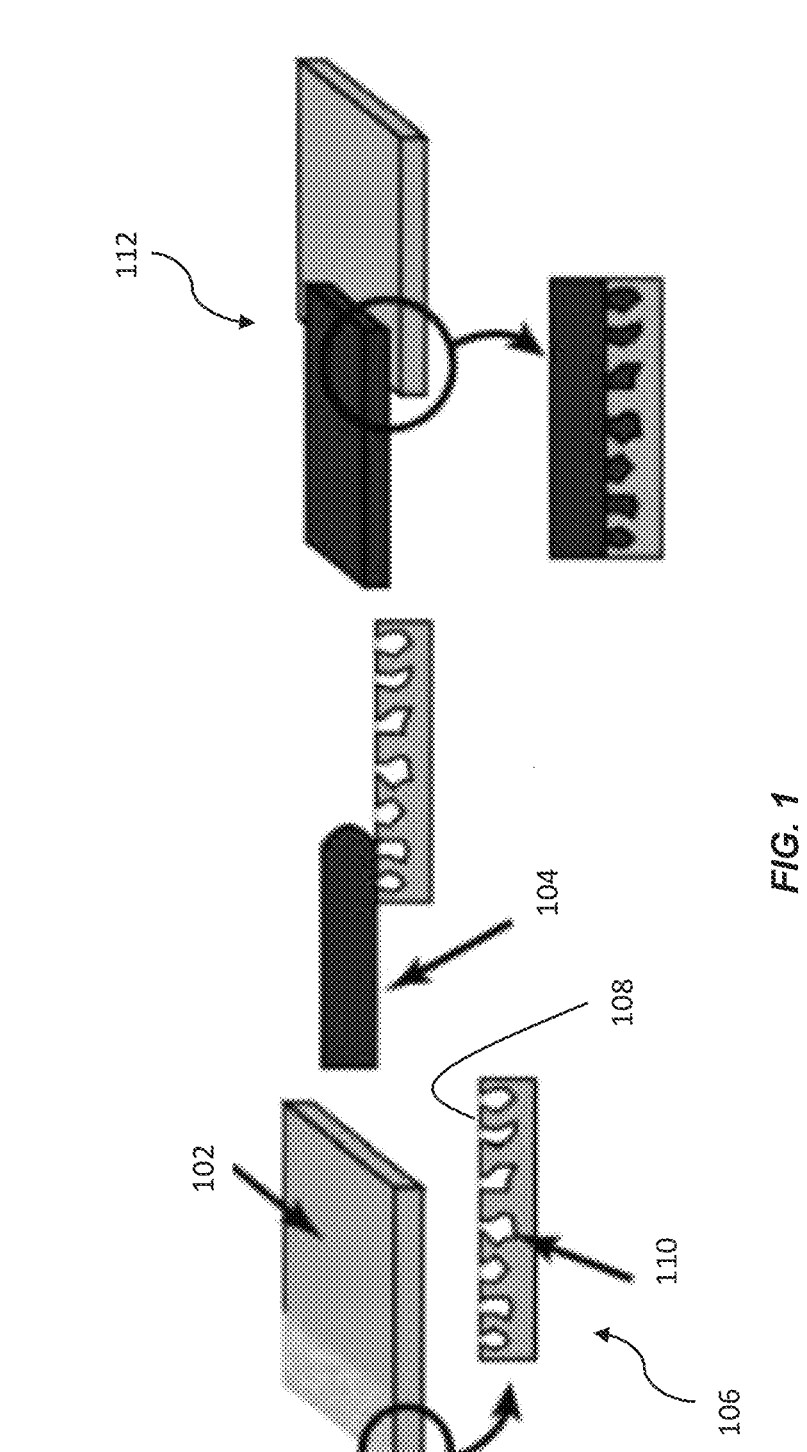
FIG. 1 shows a system for interlocking a multi-material interface.

All technical and scientific terms used herein, unless otherwise defined below, are intended to have the same meaning as commonly understood by one of ordinary skill in the art. Mention of techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims.

The term "about", as used herein to refer to a measurable value such as an amount of weight, time, etc., is meant to encompass in some embodiments variations of 20%, in some embodiments ±10%, in some embodiments ±5%, in some embodiments ±1%, in some embodiments ±0.1%, in some embodiments ±0.5%, and in some embodiments ±0.01% from the specified amount, as such variations are appropriate to perform the disclosed methods.

As used herein, the term "and/of" when used in the context of a list of entities, refers to the entities being present singly or in any possible combination or subcombination. Thus, for example, the phrase "A, B, C, and/or D" includes A, B, C, and D individually, but also includes any and all combinations and subcombinations of A, B, C, and D.

As used herein, the term "compatibility" and grammatical variants thereof refers to the ability of the two materials to be joined without generating undesirable local material properties in their contact/interface area. Traditional design paradigm requires that the multiple materials to be directly joined without the use of additional bonding/assembly mechanisms (e.g. an intermediate phase such as an adhesive, mechanical fasteners) to exhibit satisfactory compatibility due to its significant in impacting various mechanical properties of the interface such as ultimate strength, elastic modulus, ductility, toughness and overall deformation. However, such requirements impose significant design restriction with the selection of materials, which in turn limits the performance and subsequently the application of the multi-material structures.

The term "comprising", which is synonymous with "including" "containing", or "characterized by", is inclusive or open-ended and does not exclude additional, unrecited elements and/or method steps. "Comprising" is a term of art that means that the named elements and/or steps are present, but that other elements and/or steps can be added and still fall within the scope of the relevant subject matter.

As used herein, the phrase "consisting of" excludes any element, step, or ingredient not specifically recited. For example, when the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of the related disclosure or claim to the specified materials and/or steps, plus those that do not materially affect the basic and novel characteristic(s) of the disclosed and/or claimed subject matter. For example, a method of the presently disclosed subject matter can "consist essentially of" one or more enumerated steps as set forth herein, which means that the one or more enumerated steps produce most or substantially all of the intended result to be produced by the claimed method. It is noted, however, that additional steps can be encompassed within the scope of such a method, provided that the additional steps do not substantially contribute to the result for which the method is intended.

With respect to the terms "comprising", "consisting essentially of", and "consisting of", where one of these three terms is used herein, the presently disclosed and claimed subject matter can include the use of either of the other two terms. Similarly, it is also understood that in some embodiments the methods of the presently disclosed subject matter comprise the steps that are disclosed herein, in some embodiments the methods of the presently disclosed subject matter consist essentially of the steps that are disclosed, and in some embodiments the methods of the presently disclosed subject matter consist of the steps that are disclosed herein.

II. Exemplary Embodiments

The presently disclosed design concept provides multi-material interfaces without intermediate phases and allows for the use of material sets with low or no compatibility. Through a mechanical interlocking interface design, the interface properties could significantly exceed those of the traditional design that includes intermediate phases. Such enhanced design freedom would allow for this novel design concept to be applied to a broad area of applications where multi-material structures are needed. One such exemplary application area is the direct fabrication of large structures using material extrusion additive manufacturing technologies.

The interlocking effect can be implemented at the structural topology level or at both the structural topology level and the material surface level. At a structural topology level, each component material consists of one or more phases, or sub-structures, which have spatially intersecting/intertwining geometries. Upon deformation, the multiple phases prevent the separation of the two material components via interlocking interactions. In addition, the interactions between the phases of the two materials during the deformation, such as contact pressure, sliding, fully-/partially-compatible deformation and other non-mechanical and distance-sensitive effects (e.g. magnetism) could also be custom designed to achieve multiple engineering design objectives, including but not limited to elastic modulus, shear modulus, strength, elongation at failure, energy absorption/dissipation and Poisson's ratios.

The design of the interlocking interface can be based on the intrinsic characteristics of one of or both of the material involved and/or the multi-material compatibility. The multi-material compatibility could be represented by typical interfacial mechanical models such as the traction-separation model. The geometries of the multi-material phases could be designed via multiple methods such as the periodic cellular structure design and topology optimization, which optimize the topology of the geometry to ensure optimal performance.

The interlocking designs can be manufactured by various processing methods including, without limitation, investment casting, resin molding, additive manufacturing, subtractive manufacturing, or a combination of these. In general, the candidate processing technology can be capable of realizing undercut features.

FIG. 1 shows a system 100 for interlocking a multi-material interface. System 100 includes an interface of a body 102 of a base material and a filling material 104. The base material may include wood, plastic, metals such as copper, tin, aluminum, gold, silver, titanium, alloys including aluminum alloys or copper alloys such as Cu10Sn, or any combination thereof. The base material may include a rigid material. Filling material 104 may include any material deposited by material extrusion as described herein including, without limitation, polyamide 11 (PA11). Interlocking mechanisms 106 are on a surface of body 102. In some embodiments, interlocking mechanisms 106 may be formed on body 102 by additive manufacturing as described herein. In other embodiments, interlocking mechanisms 106 may be formed on body 102 by subtractive manufacturing wherein portions of body 102 are removed to form the interlocking mechanisms 106. The base material may have non-compatibility or low-compatibility with filling material 104. In some embodiments, interlocking mechanisms 106 may be separate components that are permanently attached to body 102, which may provide manufacturing simplifications by forming the interlocking mechanisms 106 separately from the body 102 that will interface with filling material 104. For example, in some embodiments, interlocking mechanisms 106 may be manufactured in bulk, and a portion of the manufactured interlocking mechanisms 106 can be cut or otherwise sized according to a particular body, and attached to a surface of the body that is intended to form an interface with filling material 104.

Interlocking mechanisms 106 form protrusions 108 and cavities 110. Interlocking mechanisms 106 may comprise either partly or entirely base material. In some embodiments, body 102 and interlocking mechanisms 106 consist of identical material, namely the base material. Interlocking mechanisms 106 may include any type of shape including hooks, loops, and/or frameworks forming boundaries of empty spaces. Interlocking mechanisms 106 may include, for example, lattice structures, geometric shapes, re-entrant auxetic structures, body-centered cubic (BCC) structures, frame-centered cubic (FCC) structures, octahedral structures, and the like. Interlocking mechanisms 106 may include a repeating pattern such a repeating geometric pattern. Interlocking mechanisms 106 may include shapes that form cavities 110 with a cross-sectional area that becomes larger in relation to its distance from a surface of body 102. Interlocking mechanisms 106 may include shapes that form cavities 110 with a first cross-sectional area and a second cross-sectional area between the first cross-sectional area and a surface of body 102, wherein the first cross-sectional area is smaller than the second cross-sectional area. Filling material 104 covers interlocking mechanisms 106 at an interface 112 by covering protrusions 108 and filling in cavities 110. Filling material 104 may fully fill in cavities 110 such that there is no empty space between interlocking mechanisms 106 and filling material 104.

Figure 2:
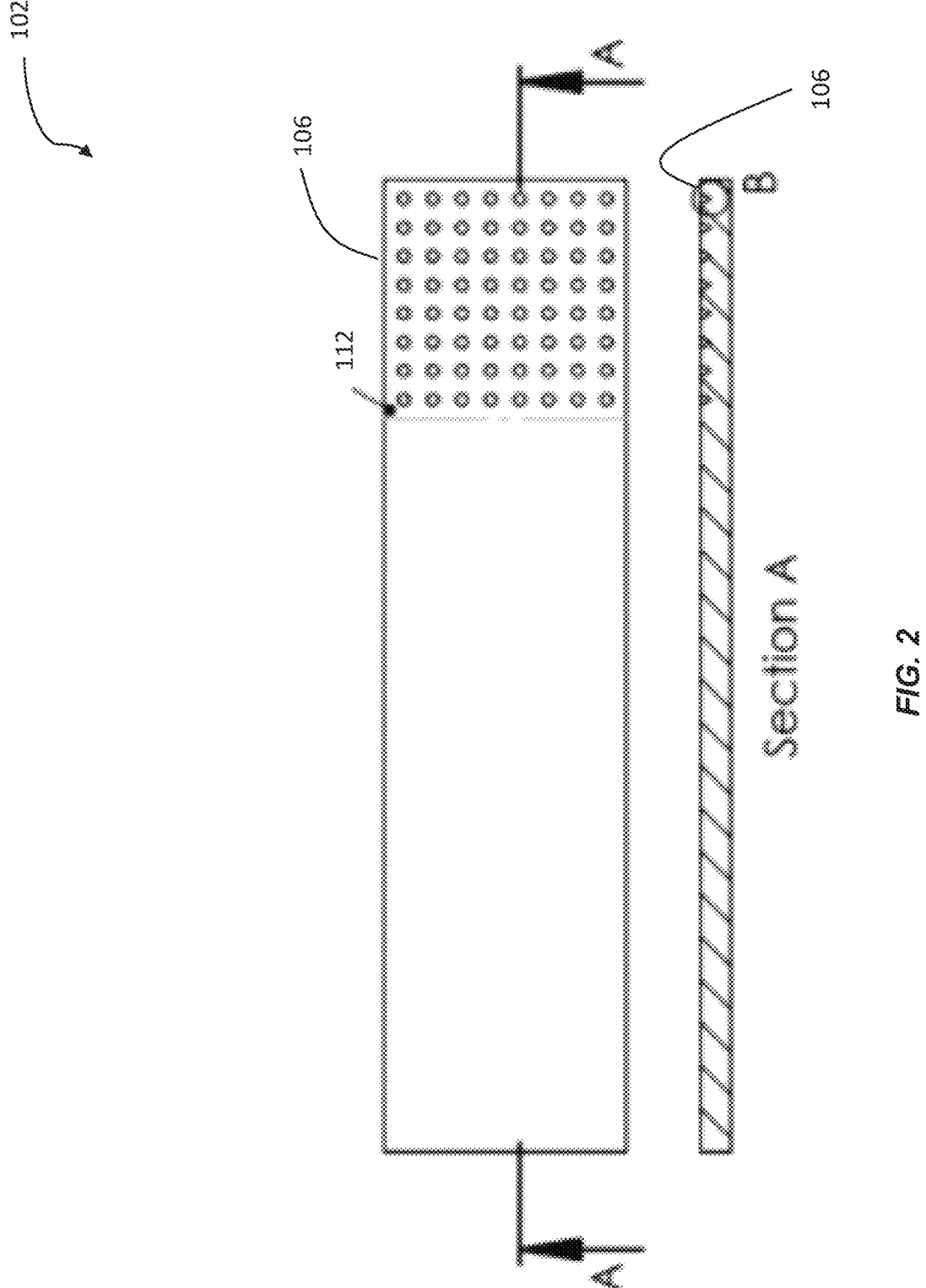
FIG. 2 shows a top view and a side cross-sectional view of a body along viewpoint A.

FIG. 2 shows a top view and a side cross-sectional view of body 102 along viewpoint A. Body 102 includes interlocking mechanisms that form the surface that joins with filling material 104 (not shown) that forms interface 112.

Figure 3:
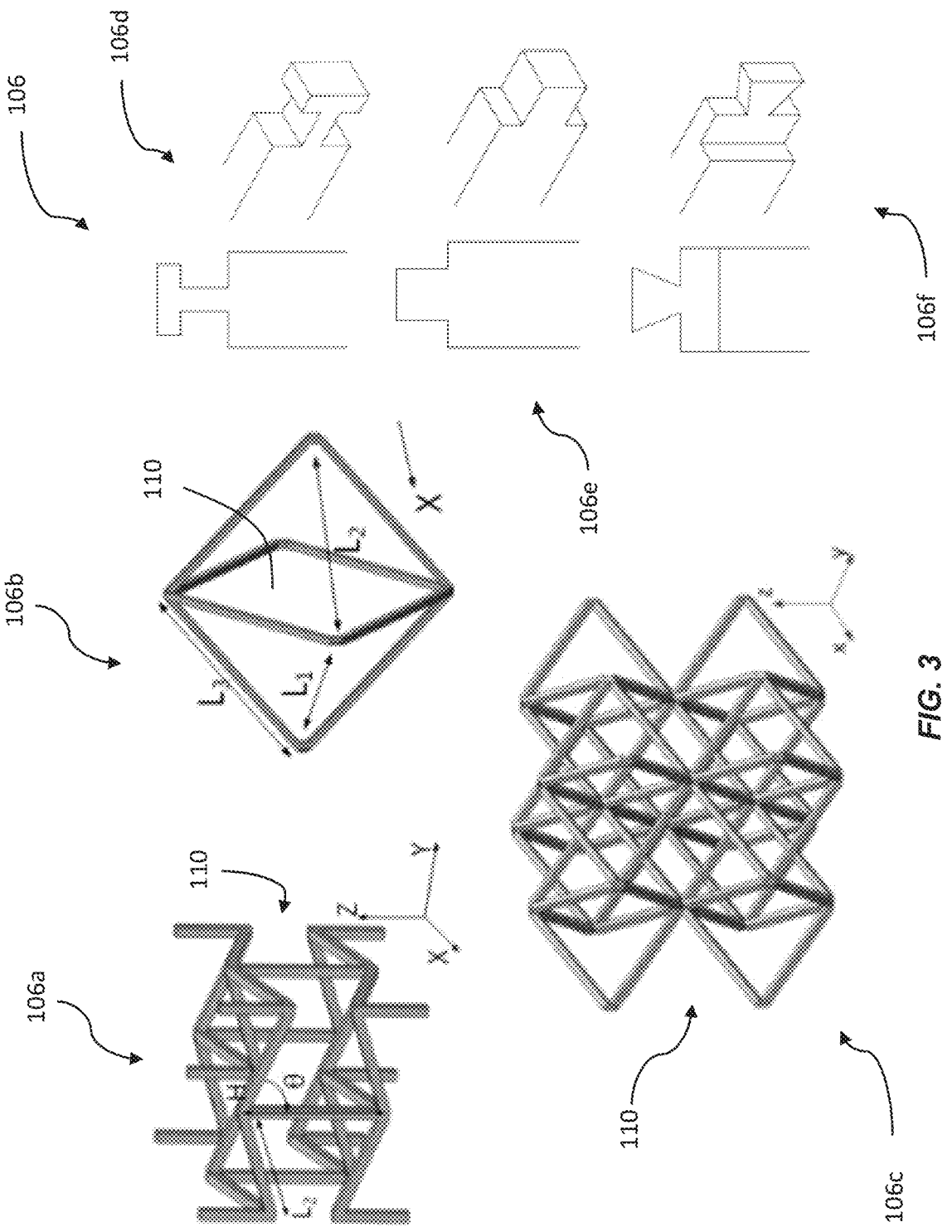
FIG. 3 shows example configurations of interlocking mechanisms.

FIG. 3 shows example configurations of interlocking mechanisms 106, specifically perspective views of interlocking mechanisms 106a-106c and side views and perspective views of interlocking mechanisms 106d-106f. Interlocking mechanisms 106a include a re-entrant auxetic structure with acute internal angles causing cavities 110 to narrow from a center of the re-entrant auxetic structure to a distal end of the re-entrant auxetic structure. The narrowing cavities 110 impede filling material 104 (not shown) once filled in the empty spaces from separating from interlocking mechanisms 106. Applied forces to the re-entrant auxetic structure can result in bending dominated with a negative Poisson's ratio.

Interlocking mechanisms 106b include an octahedral structure. The octahedral structure may include a regular octahedron with eight equilateral triangles. Applied forces to the octahedral structure can result in bending and/or shearing combined with a positive Poisson's ratio.

Interlocking mechanisms 106c include an example BCC structure. Applied forces to the BCC structure can result in bending dominated with a positive Poisson's ratio. Interlocking mechanisms 106 may include other types of BCCs.

Interlocking mechanisms 106d include a first arm extending normal from body 102 (not shown), a second narrower arm extending from the end of and parallel to the first arm, and a third perpendicular arm extending from either side of a distal end of the second arm. Interlocking mechanisms 106e include a first arm extending normal from body 102, a second narrower arm extending from the end of and parallel to the first arm. Interlocking mechanisms 106f include a first arm extending normal from body 102 and a second narrower arm extending from the end of and parallel to the first arm, wherein the second arm has opposing trapezoidal faces that widen as they extend from the first arm. Interlocking mechanisms 106d and 106f have a cross-sectional area that becomes larger farther from body 102, which helps secure filling material 104 in place once it covers the interlocking mechanisms 106d and 106f.

Figure 4:
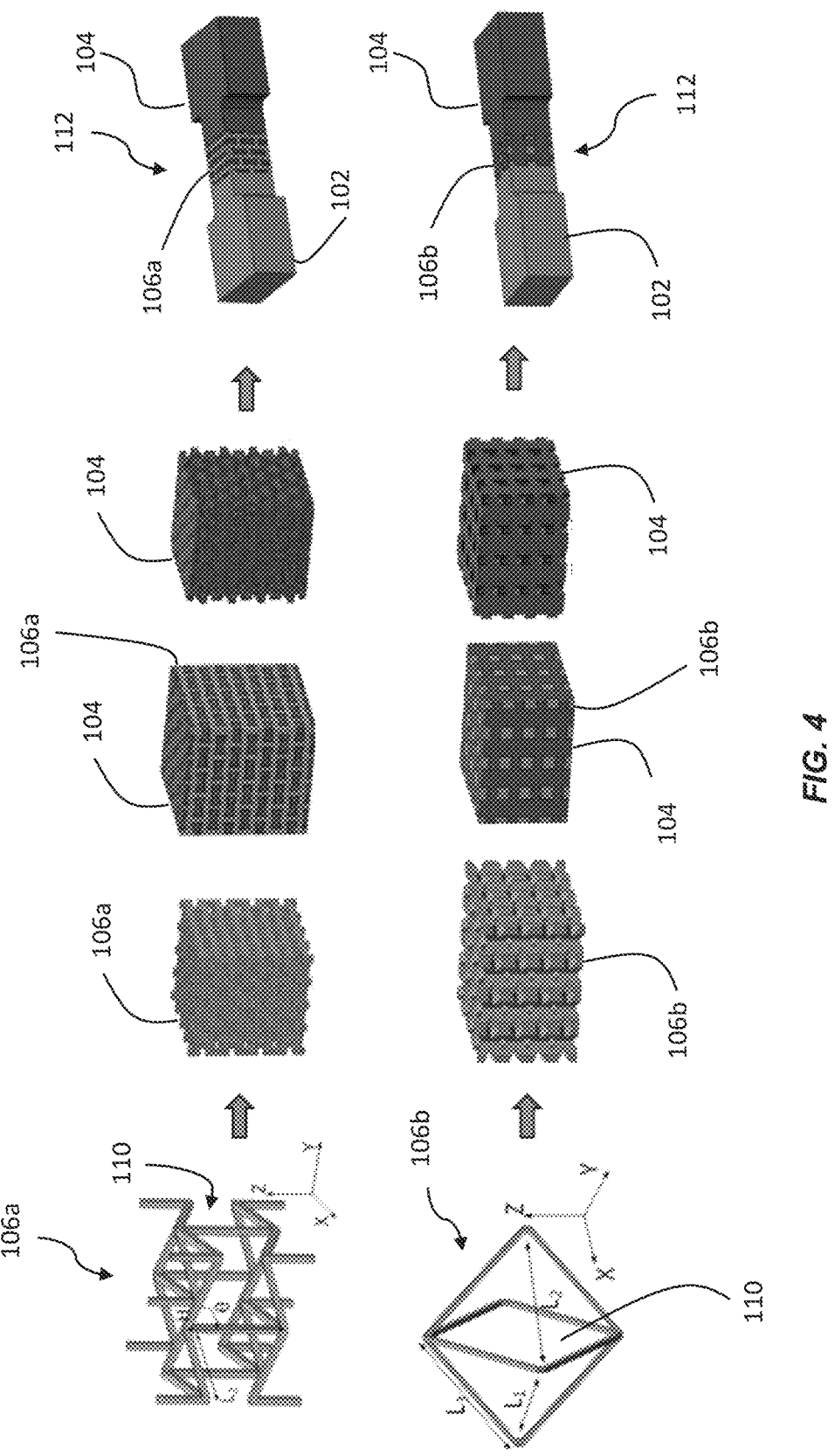
FIG. 4 shows interlocking mechanisms with a repeating pattern of re-entrant auxetic structures and octahedral structures and their interface with a filling material.

FIG. 4 shows interlocking mechanisms 106a and 106b with a repeating pattern of re-entrant auxetic structures and octahedral structures, respectively, on body 102, filling material 104 covering the interlocking mechanisms 106a and 106b including filling in cavities 110, and the resulting interface 112. FIG. 4 also shows the shape of filling material 104 caused by filling around respective interlocking mechanisms 106a and 106b.

Figures 5A, 5B, 5C, 5D:
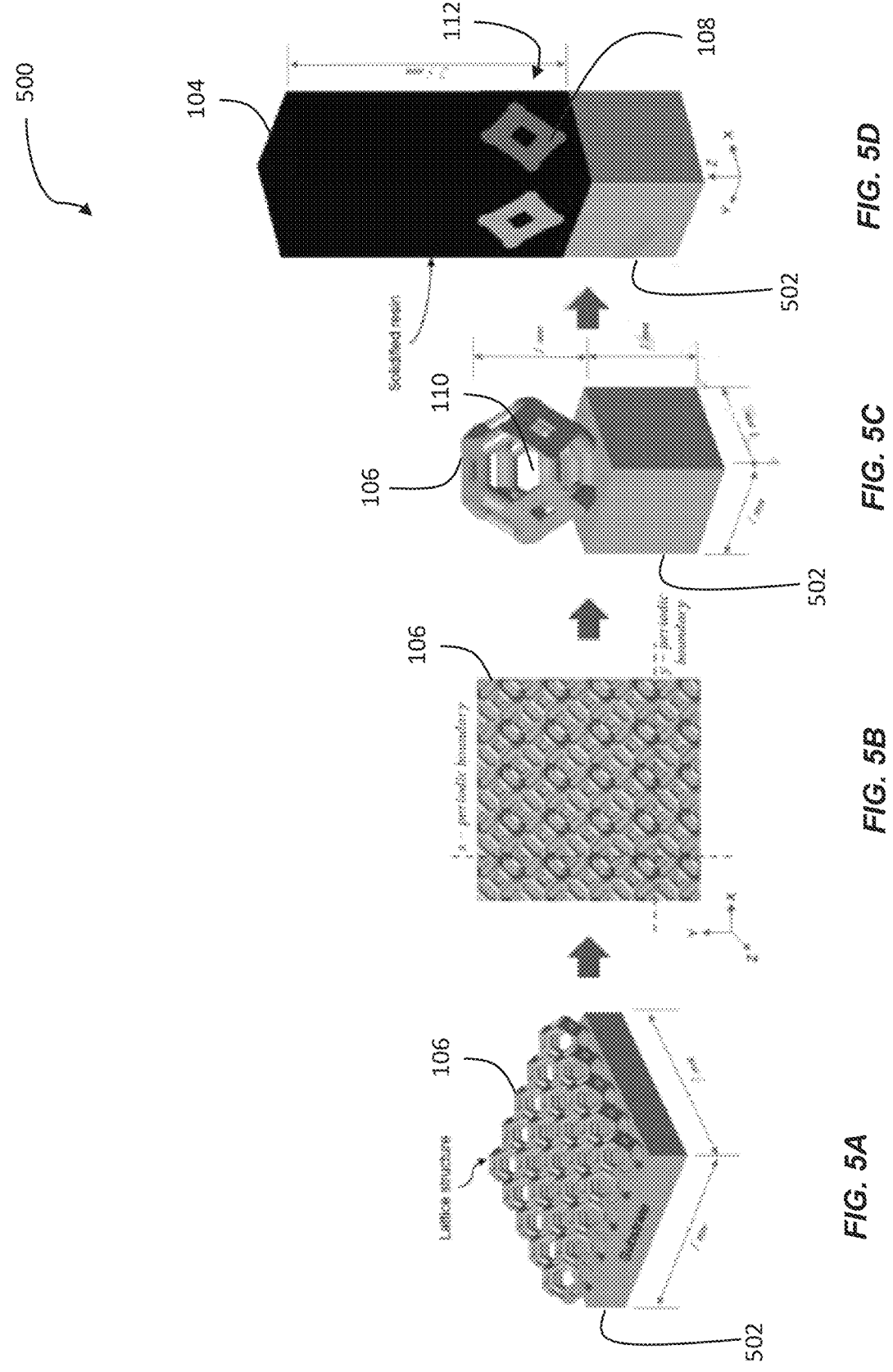
FIG. 5A shows a perspective view of interlocking mechanisms with a repeating truncated octahedron structure.
FIG. 5B shows a top view of interlocking mechanisms with a repeating truncated octahedron structure.
FIG. 5C shows a cross sectional view of a single truncated octahedron structure of interlocking mechanisms.
FIG. 5D shows a cross sectional view of a single truncated octahedron structure of interlocking mechanisms covered by a filling material.

FIGS. 5A-5D show an example of interlocking mechanisms 106 with a repeating pattern of truncated octahedron structures forming a lattice structure on body 102. In some embodiments, as shown in FIG. 5A, interlocking mechanisms 106 can be formed on a substrate 502. In some embodiments, substrate 502 includes body 102. In other embodiments, substrate is attached to body 102. FIG. 5A shows a perspective view of interlocking mechanisms 106 on substrate 502. FIG. 5B shows a top view of interlocking mechanisms 106. FIG. 5C shows a cross sectional view of a single truncated octahedron structure of interlocking mechanisms 106 on substrate 502, and FIG. 5D shows a cross sectional view of the single truncated octahedron structure of interlocking mechanisms 106 on substrate 502 covered by filling material 104 to form interface 112. FIGS. 5C and 5D illustrate that filling material 104 covers protrusions 108 of interlocking mechanisms 106 and fills in cavities 110.

Figure 6:
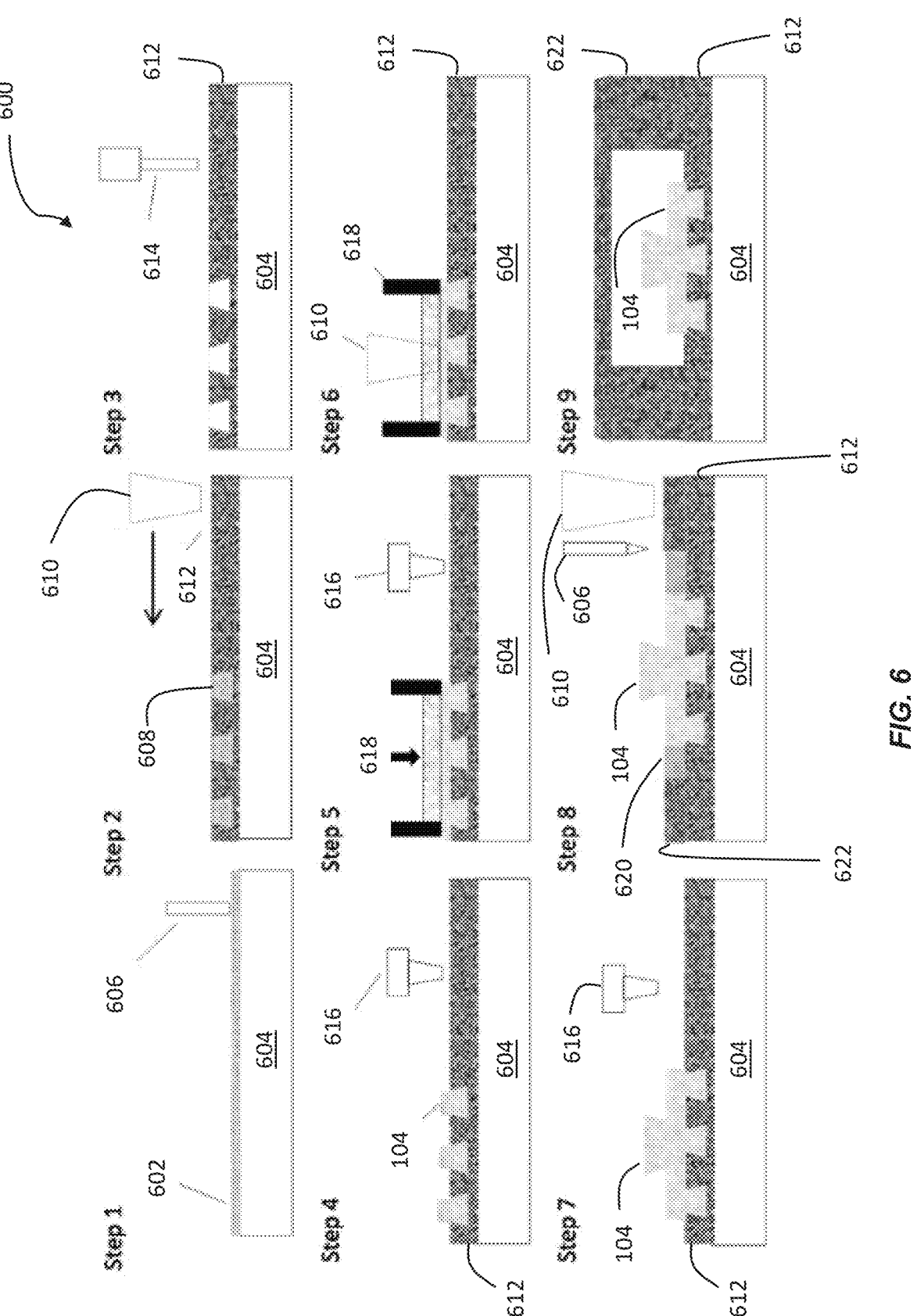
FIG. 6 shows an example method for interlocking a multi-material interface.

FIG. 6 shows an example method 600 for interlocking a multi-material interface in steps 1-9. At step 1, a first metallic powder 602 is applied to a surface of a base material 604. Metallic powder 602 may include any of the metallic substances described herein. Base material 604 may include body 102 and/or a substrate, for example substrate 502. First metallic powder 602 may be applied by a powder spray blade 606.

At step 2, At least one mechanical structure 608 is at least partially submerged in first metallic powder 602, displacing the first metallic powder 602 according to a shape of the mechanical structure 608. A heat source, such as a laser 610, selectively scans and heats first metallic powder 602 to melt is and form a first metallic solid layer 612 from the first metallic powder 602.

At step 3, mechanical structure 608 is removed from first metallic solid layer 612, leaving at least one cavity in the first metallic solid layer 612. A debris remover such as a vacuum or suction nozzle 614 may be applied to first metallic solid layer 612 to remove any remaining first metallic powder 602.

At step 4, filling material 104, such as a polymer, may fill the cavities created by the removal of mechanical structure 608. Filling material 104 may be applied by material extrusion via an extrusion nozzle 616. Material extrusion is an additive manufacturing technique wherein material is drawn through a nozzle, where it is heated and then deposited layer by layer. Materials deposited by material extrusion, such as filling material 104, may include, for example, thermoplastics such as polyethylene terephthalate glycol (PETG), acrylonitrile butadiene styrene (ABS), aliphatic polyamides (PA), high-impact polystyrene (HIPS), polylactic acid (PLA), thermoplastic polyurethane (TPU), and the like. Material extrusion may implement one or more heads on one or more nozzles to extrude the material. The one or more nozzles and/or a work surface, such as a table or stand configured to hold one or more components of the multi-material interface, may be controllably moved to control the placement of the extruded material. By utilizing the novel interlocking interface design, the designs of the multi-material structure could focus on the design for performance and functionality, thus accelerating the adoption of the technology. Base material 604 may be heated before, during, and/or after filling material 104 is deposited onto the base material 604.

At step 5, a pressing mechanism 618 may apply pressure to deposited filling material 104, which may ensure that the filling material 104 completely or substantially completely fills the cavities created by mechanical structure 608. Pressing mechanism 618 may further shape and/or flatten a surface of filling material 104. Base material 604 may be heated during this step.

At step 6, a heat source such as laser 610 scans filling material 104 to set the material. Pressing mechanism 618 may include a transparent surface such as a glass window through which the heat, i.e., laser scanning, may be applied to filling material 104 to allow the pressing mechanism 618 to apply pressure to the filling material 104 as it is being heated.

At step 7, pressing mechanism 618 is removed. Additional filling material 104 may be applied onto the set filling material 104 via extrusion nozzle 616.

At step 8, a second metallic powder 620 may be applied on top of first metallic solid layer 612. Second metallic powder 620 may include the same or different metal or alloy as first metallic powder 602/first metallic solid layer 612. Second metallic powder 620 may be applied by powder spray blade 606. Second metallic powder 620 may be positioned so it does not cover filling material 104. A heat source such as laser 610 may selectively scan and heat second metallic powder 620 to melt it, resulting in a second metallic solid layer 622.

At step 9, additional layers of second metallic powder 620 may be applied and heated to form a desired three-dimensional (3D) shape of second metallic solid layer 622. Second metallic powder 620 may be positioned around filling material 104 and may create an empty space between resulting second metallic solid layer 622 and the filling material 104.

Figure 7:
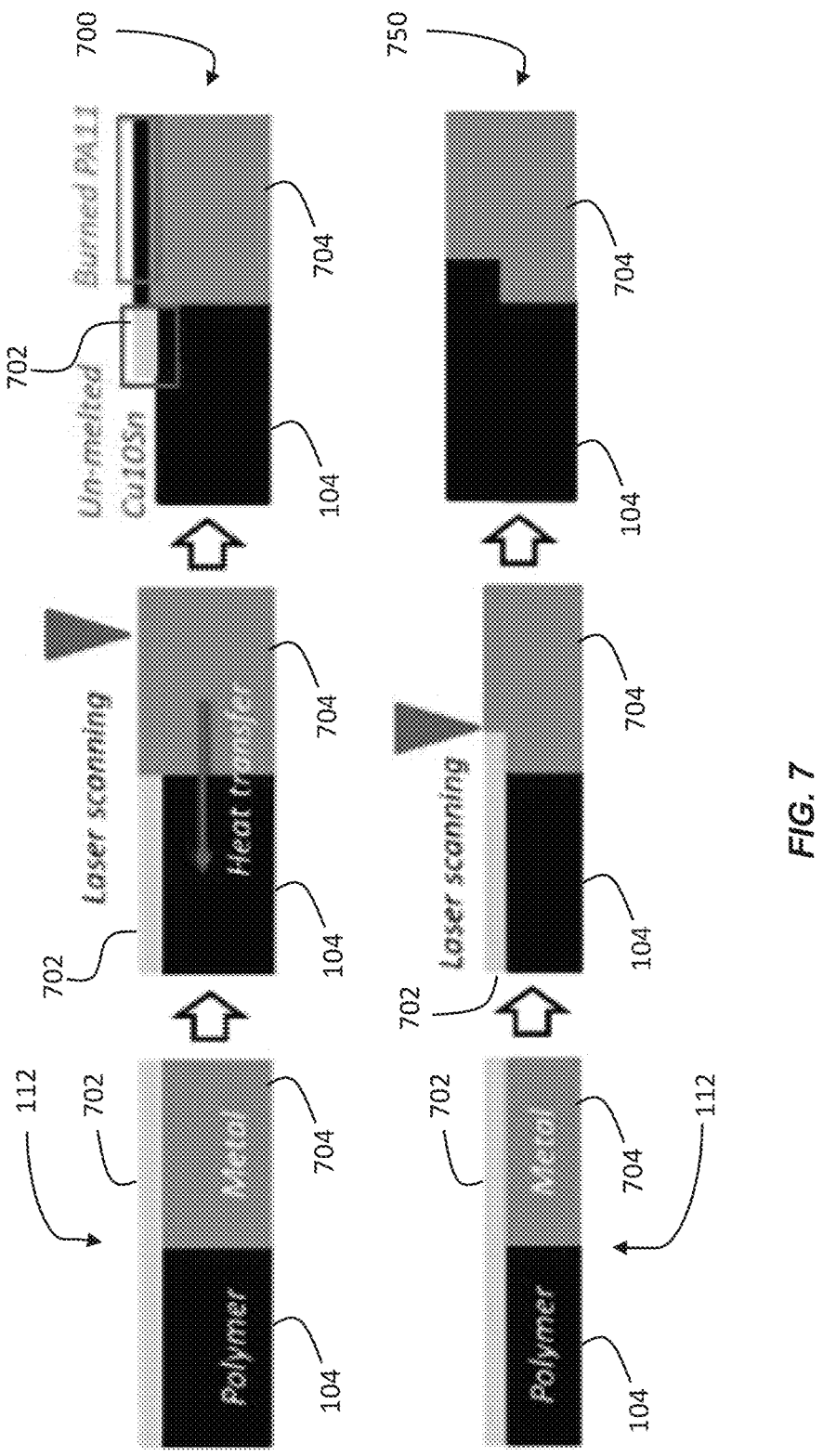
FIG. 7 shows example methods of additive manufacturing at a multi-material interface.

FIG. 7 shows example methods 700 and 750 of additive manufacturing at a multi-material interface. In method 700, a metallic powder 702 is applied to interface 112 over a surface of filling material 104 and a surface of metal 704. Metal 704 may include body 102 and/or interlocking mechanisms 106. Metallic powder 702 and/or metal 704 may include any metal or alloys described herein. Metallic powder 702 and metal 704 may have the same composition. Metallic powder 702 that is positioned on the surface of metal 704 is heated, melted, and turned into a metal solid and integral with the metal 704. In this example, metallic powder 702 is heated up to the boundary of interface 112. Most of the remaining metallic powder 702 that was not melted is removed, but some may remain on the surface of filling material 104. Also, some of filling material 104 may have repositioned onto metal 704 and been burned from the heating of the metal 704. In method 750, similar to method 700, metallic powder 702 is applied to interface 112 over a surface of filling material 104 and a surface of metal 704. Unlike method 700, only metallic powder 702 beyond a distance from interface 112 is heated, leaving a buffer between the heat and interface 112. Thus, filling material 104 is not unintentionally burned. The remaining metallic powder 702 is removed and additional filling material 104 is added, wherein a portion of the filling material 104 overlaps metal 704.

Figure 8:
FIG. 8 shows a chart of dimensions and densities of example structures of interlocking mechanisms.

FIG. 8 shows a chart 800 of dimensions and densities of example structures of interlocking mechanisms, namely a re-entrant auxetic structure, a BCC structure, and an octahedral structure.

Figure 9:
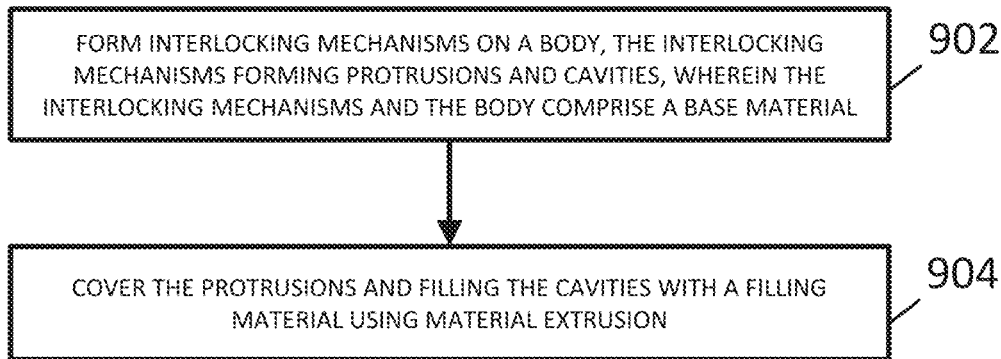
FIG. 9 is a flow chart illustrating an example method for interlocking a multi-material interface.

FIG. 9 is a flow chart illustrating an example method 900 for interlocking a multi-material interface. At step 902, interlocking mechanisms are formed on a body, the interlocking mechanisms forming protrusions and cavities, wherein the interlocking mechanisms and the body comprise a base material. Forming interlocking mechanisms can include depositing a metallic powder to a surface of the body, molding the metallic powder using mechanical structures, and heating the metallic powder to form a metallic solid layer. The mechanical structures can be removed from the formed metallic solid layer. The mechanical structures can include a geometric shape. The interlocking mechanisms can include re-entrant auxetic structures. Forming the interlocking mechanisms can include subtracting a portion of the base material from the body. The interlocking mechanisms can include a repeating geometric pattern. The cavities can include a first cross-sectional area and a second cross-sectional area between the first cross-sectional area and a surface of the body, wherein the first cross-sectional area is smaller than the second cross-sectional area.

At step 904, the protrusions are covered and the cavities are filled with a filling material using material extrusion. Covering the interlocking mechanisms with the filling material can include filling cavities formed by the re-entrant auxetic structures with the filling material. The filling material can be non-compatible or low-compatible with the base material.

III. Experiments

One of the fundamental design variables of cellular structure is the relative density, which was included in the investigation as a design variable. The two phases of the interlocking design were generated from the cellular structure and the negative space of the cellular structure, respectively. The designs were manufactured by material extrusion additive manufacturing using PLA and PETG as materials. The two materials exhibited low compatibility, therefore demonstrating one of the key advantages of the design concept. The results proved that cellular unit cells topology design was a significant factor for the interface performance. The design based on the BCC structure exhibited the highest interfacial tensile strength and elongation at break. The choice of the material assignment on the two phases of the interlocking design was also important for the design performance.

REFERENCES

All references listed throughout the instant disclosure, including but not limited to all patents, patent applications and publications thereof, scientific journal articles, and database entries are incorporated herein by reference in their entireties to the extent that they supplement, explain, provide a background for, and/or teach methodology, techniques, and/or compositions employed herein.
1. Ribeiro et al. (2018). Interface geometries in 3D multi-material prints by fused filament fabrication. Rapid Prototyping Journal. ISSN: 1355-2546.
2. Freund et al. (2019). Determination of influencing factors on interface strength of additively manufactured multi-material parts by material extrusion. Applied Sciences, 9(9), 1782.
3. Skylar-Scott et al. (2019). Voxelated soft matter via multimaterial multinozzle 3D printing. Nature, 575 (7782), 330-335.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A method for interlocking a multi-material interface, the method comprising:

forming interlocking mechanisms on a body, the interlocking mechanisms forming protrusions and cavities, wherein the interlocking mechanisms and the body comprise a base material, wherein the interlocking mechanisms further comprise a body-centered cubic structure or a frame-centered cubic structure; and covering the protrusions and filling the cavities with a filling material using material extrusion.

2. The method of claim 1, wherein forming interlocking mechanisms comprises depositing a metallic powder to a surface of the body, molding the metallic powder using mechanical structures, and heating the metallic powder to form a metallic solid layer.

3. The method of claim 2, further comprising removing the mechanical structures from the formed metallic solid layer.

4. The method of claim 2, wherein the mechanical structures comprise a geometric shape.

5. The method of claim 1, wherein forming the interlocking mechanisms comprises subtracting a portion of the base material from the body.

6. The method of claim 1, wherein the interlocking mechanisms comprise a repeating geometric pattern.

7. The method of claim 1, wherein the filling material is non-compatible or low-compatible with the base material.

8. The method of claim 1, wherein the cavities comprise a first cross-sectional area and a second cross-sectional area between the first cross-sectional area and a surface of the body, wherein the first cross-sectional area is smaller than the second cross-sectional area.

9. A system for interlocking a multi-material interface, the system comprising:

a body comprising a base material;

interlocking mechanisms on the body, the interlocking mechanisms forming protrusions and cavities on the body, wherein the interlocking mechanisms comprise the base material, wherein the interlocking mechanisms further comprise a body-centered cubic structure or a frame-centered cubic structure; and a filling material covering the protrusions and filling the cavities.

10. The system of claim 9, wherein the interlocking mechanisms are formed by depositing a metallic powder to a surface of the body, molding the metallic powder using mechanical structures, and heating the metallic powder to form a metallic solid layer.

11. The system of claim 10, wherein the mechanical structures are removed from the formed metallic solid layer.

12. The system of claim 10, wherein the mechanical structures comprise a geometric shape.

13. The system of claim 9, wherein the interlocking mechanisms comprise octahedral structures.

14. The system of claim 9, wherein the interlocking mechanisms comprise a repeating geometric pattern.

15. The system of claim 9, wherein the filling material is non-compatible or low-compatible with the base material.

16. The system of claim 9, wherein the cavities comprise a first cross-sectional area and a second cross-sectional area between the first cross-sectional area and a surface of the body, wherein the first cross-sectional area is smaller than the second cross-sectional area.

\* \* \* \* \*